United States Patent [19]

Maekawa et al.

[11] Patent Number: 5,627,737

[45] Date of Patent: May 6, 1997

[54] POWER INVERTER FOR USE IN SYSTEM INTERCONNECTION

[75] Inventors: Masahiro Maekawa; Yasuhiro Makino; Etsuko Yamamoto; Masaki Yugo, all of Osaka; Wataru Horio; Takehito Ike, both of Hyogo; Ding Lu, Osaka, all of Japan

[73] Assignee: Sanyo Electric Co., Ltd., Osaka, Japan

[21] Appl. No.: 304,948

[22] Filed: Sep. 13, 1994

[30]     Foreign Application Priority Data

Sep. 13, 1993  [JP]  Japan ................................ 5-227243
Nov. 9, 1993   [JP]  Japan ................................ 5-279141
May 31, 1994   [JP]  Japan ................................ 6-118466

[51] Int. Cl.$^6$ ........................................... H02M 1/12
[52] U.S. Cl. ........................... 363/40; 307/87; 307/73
[58] Field of Search .......................... 307/87, 73, 64, 307/60, 61, 63; 323/217; 363/95, 40

[56]           References Cited

U.S. PATENT DOCUMENTS

| 4,366,389 | 12/1982 | Hussey ............................. 307/66 |
| 4,782,241 | 11/1988 | Baker et al. ....................... 307/66 |
| 4,819,121 | 4/1989 | Saito et al. ........................ 361/85 |
| 5,221,862 | 6/1993 | Fiorina et al. ..................... 307/66 |
| 5,422,518 | 6/1995 | Sashida ............................. 307/75 |

FOREIGN PATENT DOCUMENTS

| 576271 | 12/1993 | European Pat. Off. . |
| 6-14465 | 1/1994 | Japan . |
| 6-245388 | 9/1994 | Japan . |
| 6-311653 | 11/1994 | Japan . |
| 6-327258 | 11/1994 | Japan . |

OTHER PUBLICATIONS

Abstracts of Japanese Patent Applications Laid-Open Nos. 6–14465/1994, 6–245388/1994, 6–311653/1994, 6–327258/1994.

Primary Examiner—Peter S. Wong
Assistant Examiner—Shawn Riley

[57]             ABSTRACT

A power inverter for use in the system interconnection of a direct-current supply with a commercial alternating-current supply includes an inverter circuit and a filter circuit. Feedback signals affecting the frequency of an output to be produced by the inverter circuit are taken from the filter circuit having frequency response characteristics such that the phase angle is reduced to 0° at three frequencies consisting of a higher frequency, lower frequency and commercial frequency, the last of which lies halfway between the first and second. Under the normal condition, the frequency of the output produced by the inverter circuit is equal to the commercial frequency. In the event of a power failure or power cut in the commercial alternating-current supply system, deviation from the commercial frequency is caused by the characteristics of the filter circuit.

18 Claims, 6 Drawing Sheets

POWER INVERTER FOR USE IN SYSTEM INTERCONNECTION

BACKGROUND OF THE INVENTION

This application claims the priority of Japanese Patent Applications No. 227243/1993 filed on Sep. 13, 1993, No. 279141/1993 filed on Nov. 9, 1993 and No. 118466/1994 filed on May 31, 1994, which are incorporated herein by reference.

1. Field of the Invention

The present invention relates to a power inverter, and more particularly to a power inverter for use in interconnecting a direct-current supply and a commercial alternating-current supply so that the power may be supplied by both of them to a load.

2. Description of the Prior Art

System interconnection of the kind indicated above is recommended from the standpoint of economy of energy, such system interconnection being particularly suitable for employment in those cases where a direct-current supply such as a solar battery or a fuel cell is connected to a commercial alternating-current supply through a power inverter so that electrical energy may be supplied by both of them to a load such as a household electric appliance.

In order to insure the safe prosecution of maintenance work to be done for a commercial alternating-current supply system involved in a system interconnection, the connection between the power inverter and the commercial alternating-current supply must be cut when an accidental power failure happens or a scheduled power cut takes place in the commercial alternating-current supply system. Therefore, it is necessary to provide a means for cutting the connection therebetween at the time of the above-mentioned power failure or power cut so as to prevent the direct-current supply system from becoming an independent current supply.

When a transition occurs from the state in which two current supplies are concurrently operative to the state in which only one current supply is operative, a marked variation in the voltage level or frequency at a junction point between the power inverter and the commercial alternating-current supply is caused thereby with a fair degree of certainty. The connection therebetween may be cut when this variation is detected. However, in a state of equilibrium in which the output power of the power inverter is nearly equal to the demand of the load, the voltage level or frequency at the above-mentioned junction point hardly undergoes a variation and, consequently, a power failure or power cut in the commercial alternating-current supply system cannot be detected.

In a known method of detecting the power failure or power cut, a band-pass filter for separating a fundamental frequency component from the output voltage of an inverter circuit is installed in a feedback path provided for controlling the output current of the inverter circuit. The band-pass filter has a center frequency which deviates from the commercial frequency by several Hz so that the frequency of an output to be produced by the power inverter at the time of a power failure or power cut may be allowed to vary from the commercial frequency to the center frequency of the band-pass filter.

Under the normal condition, the frequency of the voltage at the above-mentioned junction point is held at the commercial frequency by the commercial alternating-current supply. The band-pass filter having a center frequency deviating from the commercial frequency causes a phase difference between the output current and the output voltage of the power inverter. This phase difference in turn causes a decrease in the power factor of the power inverter. The power failure or power cut cannot be detected when the state of equilibrium is caused by the absolute value of the power factor of the load which is equal to the absolute value of the power factor of the power inverter.

SUMMARY OF THE INVENTION

In view of the above-described problems, the primary object of the invention is to provide a power inverter which is reliable in preventing the direct-current supply system from becoming an independent current supply, this reliability being obtained without detriment to the power factor.

The foregoing object is attained by incorporating an inverter circuit and a filter circuit in the power inverter.

Feedback signals affecting the current and the frequency of an output to be produced by the inverter circuit are taken from the filter circuit. The filter circuit is adapted to separate a fundamental frequency component from voltage at a junction point between the inverter circuit and a commercial alternating-current supply. The filter circuit has frequency response characteristics such that the phase angle is reduced to 0° at a first frequency which is equal to a commercial frequency, at a second frequency which is higher than the commercial frequency, and at a third frequency which is lower than the commercial frequency.

When two current supplies are allowed to be concurrently operative, the center frequency of the component separated by the filter circuit is equal to the commercial frequency. The inverter circuit outputs a current at the commercial frequency synchronized with the voltage at the junction point. However, the center frequency of the component separated by the filter circuit deviates from the commercial frequency when an accidental power failure happens or a scheduled power cut takes place in the commercial alternating-current supply system. A variation in the frequency of the output current of the inverter circuit is caused thereby, and so is a variation in the frequency of the voltage at the junction point. A protective device monitors the frequency of the voltage at the junction point so that a variation therein may induce disconnection of the inverter circuit from the commercial alternating-current supply.

DESCRIPTION OF THE PREFERRED EMBODIMENTS

Figure 1:
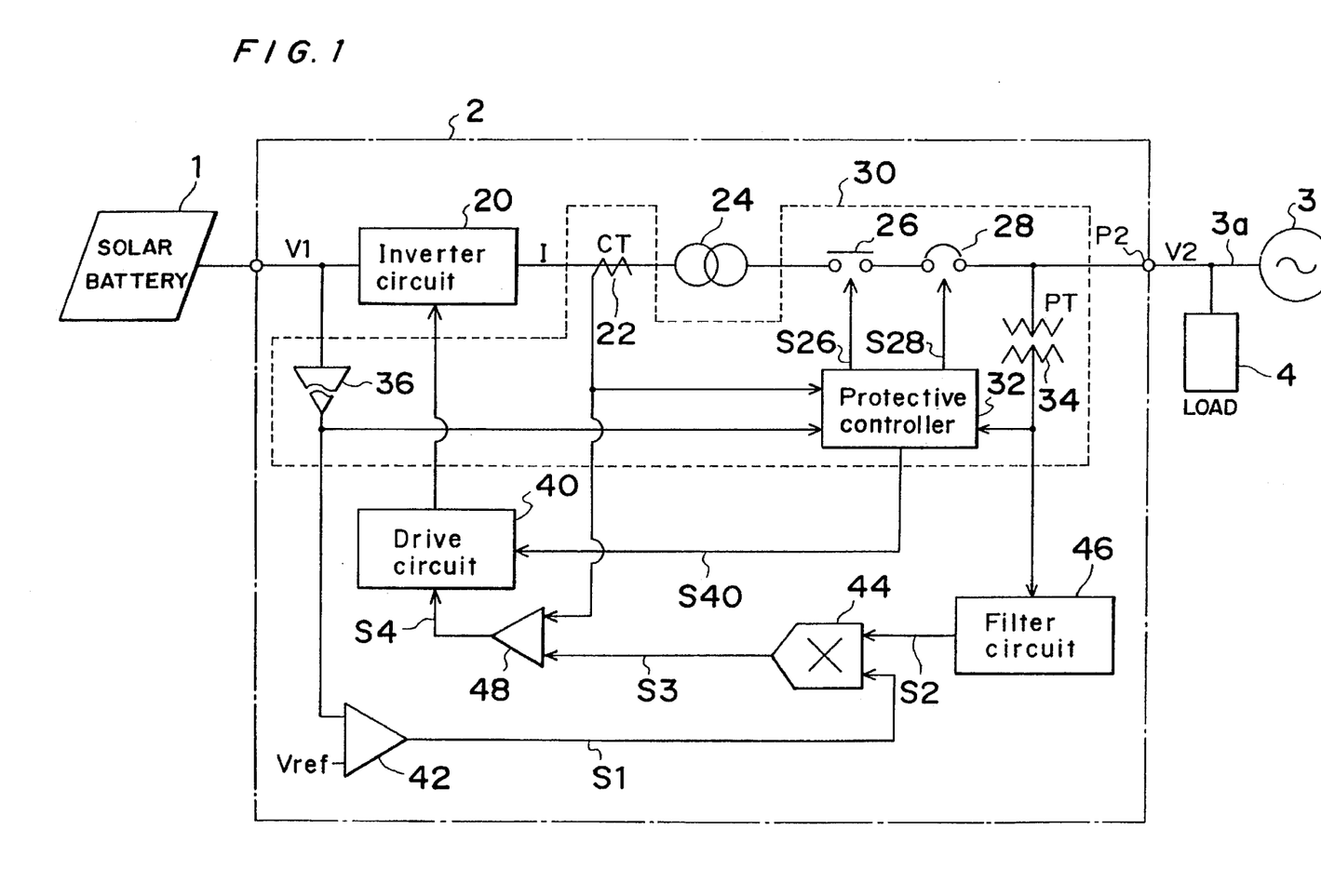
FIG. 1 is a block diagram to help explain the construction of a power inverter of the present invention.

Referring now to FIG. 1, a direct-current supply system includes a solar battery 1 that converts solar light energy into electrical energy and has an optimum operating voltage of 200 V and an optimum operating power of 3 kW. The direct-current supply system further includes a power inverter 2 in which an inverter circuit 20 is incorporated.

The output power of the solar battery 1 is converted into alternating-current power, which is fed to a load 4 (such as a household electric appliance) connected to a line 3a of a commercial alternating-current supply system 3.

The inverter circuit 20 includes a switching circuit and an inverted L-type filter. The switching circuit has four switching elements bridged across direct-current input terminals and four diodes respectively connected in parallel with the four switching elements to absorb the reverse voltage. The inverted L-type filter is intended for obtaining an output which is essentially free of undesirable higher harmonics. A drive circuit 40 capable of driving the inverter circuit 20 generates pulse signals, which have been subjected to pulse-width modulation so as to be adapted to control the switching elements.

Disposed between the inverter circuit 20 and the commercial alternating-current supply system 3 in increasing order of distance from the inverter circuit 20 are a current transformer 22 for detecting the actual output current I of the inverter circuit 20, an insulating transformer 24, a relay 26 and a breaker 28, the last two of which are used for completing or breaking the path of the current between the inverter circuit 20 and the commercial alternating-current supply system 3. The commercial alternating-current supply system 3 is doubly protected when both of the relay 26 and the breaker 28 are open, because both of them being open are tantamount to the disconnection of the commercial alternating-current supply system 3 from the inverter circuit 20 in two places. The relay 26 is actuated by a signal S26 taken from a protective controller 32. The breaker 28 is opened by a signal S28 taken from the protective controller 32. The breaker 28 must be manually closed.

A microprocessor for the execution of a control program is incorporated in the protective controller 32. For the control to be effected over the relay 26 and the breaker 28, the state of the direct-current supply system and the commercial alternating-current supply system 3 is monitored by the protective controller 32. For opening the relay 26, the protective controller 32 feeds a gate turn-off signal S40 to the drive circuit 40 so that the inverter circuit 20 may be made inoperative thereby. Parameters monitored by the protective controller 32 are the output voltage V1 of the solar battery 1, voltage V2 at the junction point P2 between the inverter circuit 20 and the commercial alternating-current supply system 3, and the output current I of the inverter circuit 20. The protective controller 32, an isolation amplifier 36 for detecting the output voltage V1, the current transformer 22 for detecting the actual output current I of the inverter circuit 20, a transformer 34 for detecting the voltage V2, the relay 26 and the breaker 28 constitute a protective device 30 by which the connection between the inverter circuit 20 and the commercial alternating-current supply system 3 is cut when an abnormal condition occurs.

In the following four cases, the connection between the inverter circuit 20 and the commercial alternating-current supply system 3 is cut by the protective device 30:

The first of the four cases is the case where the rms value of voltage V2 or frequency at the junction point deviates from a normal range prescribed by the superintendent of the commercial alternating-current supply system 3. For example, if the rms value of voltage V2 has a reference value of 101 V, the normal range of the rms value of voltage V2 is 101 ±6 V. The frequency is said to be within a normal range if the frequency does not vary more than plus or minus 1% from the fundamental frequency.

The second of the four cases is the case where only the direct-current supply system is operative, with the supply of electrical energy from the commercial alternating-current supply system 3 being cut off. Criterions for detecting the state in which only the direct-current supply system is operative will be mentioned in the latter part of this specification.

The third of the four cases is the case where the output current I of the inverter circuit 20 instantaneously exceeds 45 A, i.e., 150% of the rated current, "instantaneously" as termed in this case meaning "with a duration of less than 600 $\mu s$". Such an instantaneous overcurrent occurs as a transient phenomenon caused by, e.g., an instantaneous power failure or power cut in the commercial alternating-current supply system 3.

In the above-described three cases, only the relay 26 is opened by the protective controller 32, while the breaker 28 remains closed so that a recovery to the system interconnection need not be made manually but may be made automatically.

The last of the four cases is the case where the output current I of the inverter circuit 20 exceeds 45 A over a 600–$\mu s$ period or longer. In this case, the inverter circuit 20 should be made inoperative because it must be suspected of trouble, and both the relay 26 and the breaker 28 are opened.

Reference will now be specifically made to the voltage type current-controlled type power conversion carried out by the inverter circuit 20 and its feedback control system incorporated in the power inverter 2.

The input voltage V1 of the inverter circuit 20 varies with the intensity of solar radiation. In the first place, voltage V1 detected by the isolation amplifier 36 is fed to a differential amplifier 42, which amplifies a difference between voltage V1 and reference voltage Vref, the latter denoting the optimum operating point of the solar battery 1. An input error signal S1 resulting from this amplification is used as one of the two inputs to a multiplier 44, while the other of the two inputs thereto is a fundamental frequency component S2 separated by a filter circuit 46 from voltage V2 at the junction point P2. The input error signal S1 is multiplied by the fundamental frequency component S2 so that a product may be obtained in the form of a signal S3, which serves as a command such that the amplitude of the output current I of the inverter circuit 20 is to be set by the input error signal S1 and the phase of the output current I of the inverter circuit 20 is to be set by the voltage V2 at the junction point P2.

The command signal S3 and the actual output current I detected by the current transformer 22 are fed to an error amplifier 48. A current error signal S4 developed by the error amplifier 48 is fed to the drive circuit 40.

The drive circuit 40 compares the current error signal S4 with a reference signal which takes the form of a triangular wave having a frequency of about 20 kHz. The result of this comparison is subjected to logical operation so that pulse signals to be obtained therefrom may be subjected to pulse-width modulation so as to allow the signal level of the current error signal S4 to be reduced to zero. The pulse signals are fed to the inverter circuit 20 as control signals for controlling the switching elements. The feed of the pulse signals is effected through gate circuits controlled by the protective controller 32.

In ordinary operation, a value of current intensity is set so that maximum power may be taken from the solar battery 1 under the condition of the above-described feedback control. Current I, which is in phase with the fundamental frequency component (excluding noise) of voltage V2, is fed from the inverter circuit 20 to the load 4. The power factor of the inverter circuit 20 is 1, because the output voltage of the inverter circuit 20 is determined by the commercial alternating-current supply system 3. In other words, the inverter circuit 20 supplies the load 4 with only effective power, and the load 4 gets a supply of reactive power from the commercial alternating-current supply system 3.

It will be evident from the foregoing that, in the control over the inverter circuit 20, the frequency of the actual output current I is dependent upon how the filter circuit 46 works.

Figure 2:
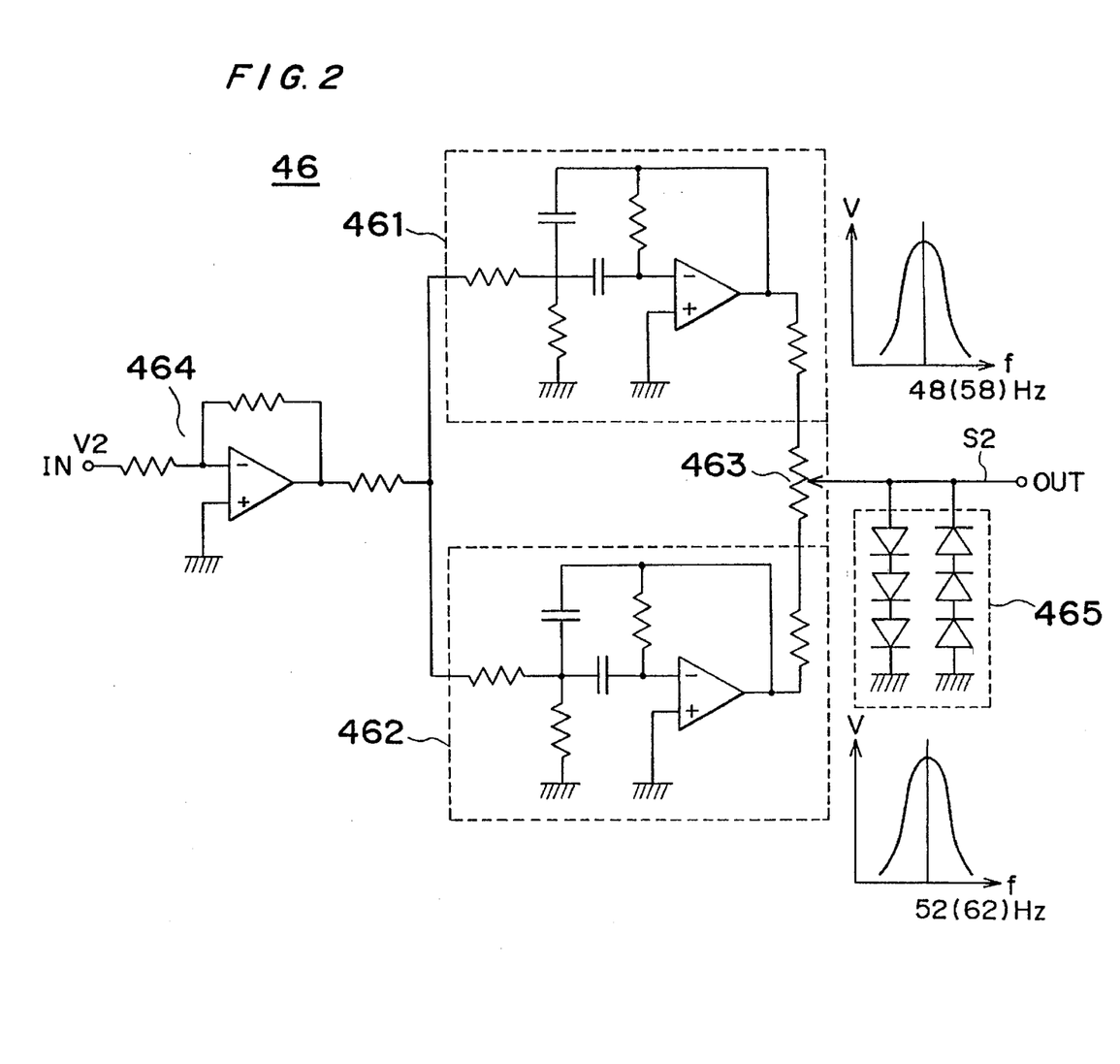
FIG. 2 is a schematic illustration of the filter circuit.

Referring now to FIG. 2, the filter circuit 46 comprises a potentiometer 463 for adjusting the output balance, band-pass filter (BPF) circuits 461 and 462 connected in parallel with each other with the potentiometer 463 disposed at the output side of the parallel-connected BPF circuits 461 and 462, an amplification circuit 464 for adjusting the input level, and an output voltage limiting circuit 465 for improving the frequency-gain characteristics. Each of the amplification circuit 464 and the BPF circuits 461 and 462 includes an operational amplifier and passive elements.

The BPF circuit 461 is different from the BPF circuit 62 in the center frequency of the pass band. Let it be supposed that a commercial frequency available is 50 Hz. The circuit constants of the BPF circuit 461 are set so as to make the center frequency of the pass band lower by 2 Hz than the commercial frequency, while the circuit constants of the BPF circuit 462 are set so as to make the center frequency of the pass band higher by 2 Hz than the commercial frequency. Thus the center frequencies of the pass bands of the BPF circuits 461 and 462 are 48 Hz and 52 Hz respectively.

The values of selectivity Q for both the BPF circuits 461 and 462 are set at 22. The reciprocal of the selectivity Q denotes a pass band width. The larger the selectivity Q is, the steeper a gain characteristic curve is. The set value of the selectivity Q may be changed within the range between 15 and 30.

The output voltage limiting circuit 465 for limiting the peak value of the output consists of a plurality of diodes connected in anti-parallel with each other between an output terminal and a grounding terminal. In other words, the gain of the filter circuit 46 at the commercial frequency (50 Hz) and the gains thereof at the center frequencies (48 Hz and 52 Hz) of the BPF circuits 461 and 462 are approximated to each other by the output voltage limiting circuit 465. If it were not for the output voltage limiting circuit 465, the gain of the filter circuit 46 at 48 Hz or 52 Hz would be much larger than the gain thereof at 50 Hz. This means that the amplitude of an output produced by the filter circuit 46 would become too large and an overcurrent would occur at the output side of the inverter circuit 20 when the operating frequency of the filter circuit 46 changes from 50 Hz to 48 Hz or 52 Hz because of a power failure or power cut in the commercial alternating-current supply system 3.

Figure 3:
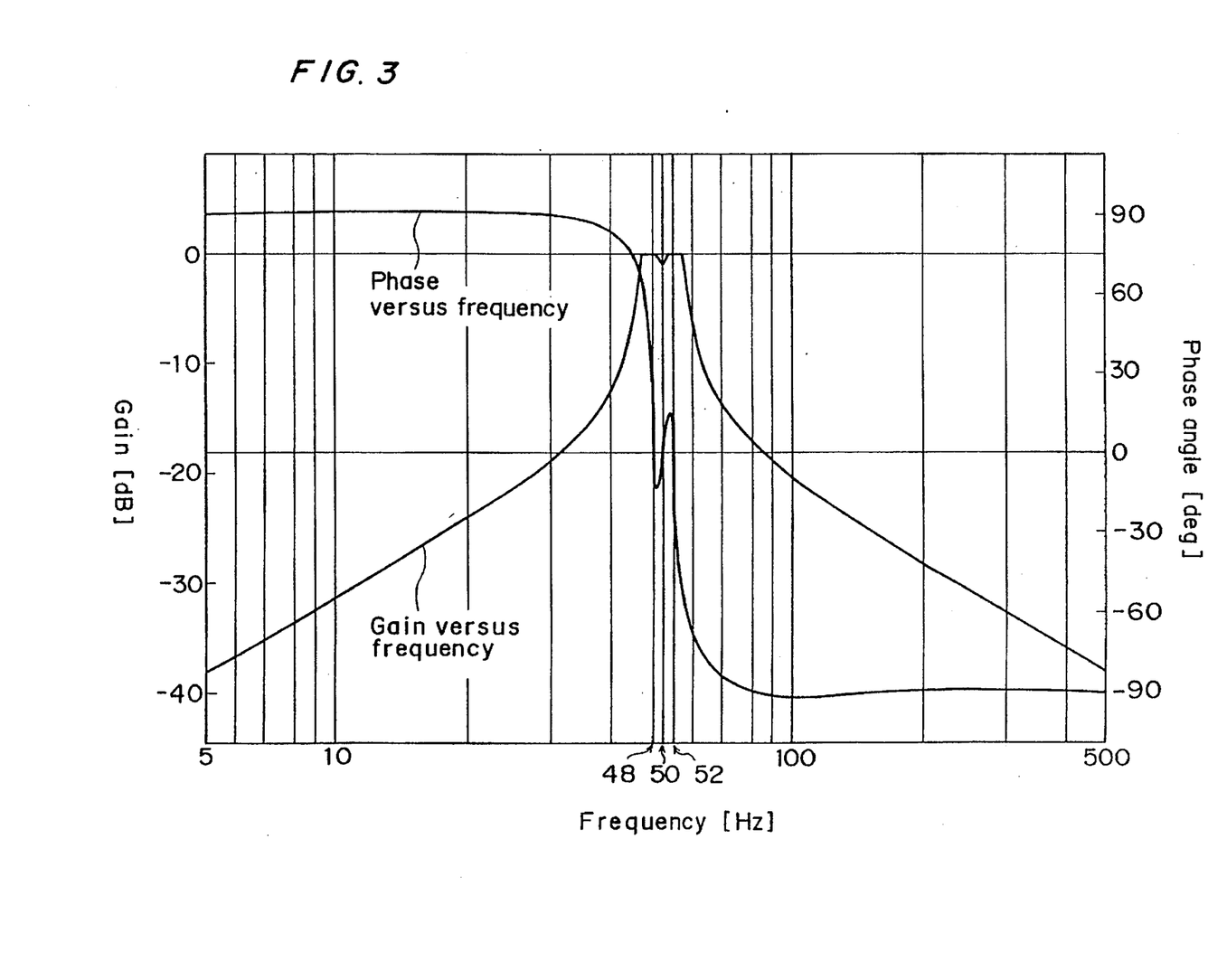
FIG. 3 is a Bode diagram to help explain the frequency response characteristics of the filter circuit.

As shown in FIG. 3, the gain of the filter circuit 46 assumes a maximum value (0 dB) in two frequency bands in the vicinity of the commercial frequency (50 Hz). One of these two frequency bands is found at the lower side of the commercial frequency and ranges from 45 to 49.25 Hz, while the other is found at the higher side and ranges from 50.75 to 55 Hz. At the commercial frequency, the filter circuit 46 has a gain of minus several dB. This means that an instantaneous increase in the gain results from a power failure or power cut in the commercial alternating-current supply system 3 and that an overcurrent occurs as a transient phenomenon at the output side of the inverter circuit 20. As mentioned above, the protective device 30 discriminates between an overcurrent caused by an instantaneous increase in the gain of the filter circuit 46 and an overcurrent caused by trouble with the inverter circuit 20. The criterion for this discrimination is the length of time the overcurrent lasts.

Reference will now be specifically made to the plots of phase versus frequency in FIG. 3, in which the phase angle (i.e. the phase difference between an input waveform and an output waveform) is nearly reduced to 0° at the above-described first frequency (50 Hz), second frequency (52 Hz) and third frequency (48 Hz), while the phase angle undergoes a marked variation in the frequency range between 48 Hz and 52 Hz.

The filter circuit 46 having the above-described frequency response characteristics is apt to work at a frequency (48 Hz or 52 Hz) at which the largest gain is obtained and the phase difference is reduced to 0°. In other words, the filter circuit 46 is apt to take out a signal component of 48 Hz or 52 Hz.

The commercial alternating-current supply system 3 has a capacity which is extraordinarily larger than the capacity of the solar battery 1 and has a stable frequency. Therefore, when these two current supplies are concurrently in an operative state, voltage V2 at the junction point P2 is determined by the commercial alternating-current supply system 3, and the frequency of the output current I of the inverter circuit 20 is held at the commercial frequency (50 Hz). Consequently, the operating frequency of the filter circuit 46 is nearly fixed to a metastable point which is also the commercial frequency. Thus a voltage wave, which has a frequency of 50 Hz and is in phase with the system voltage of the commercial alternating-current supply system 3, is outputted from the filter circuit 46.

Reference will now be specifically made to how the connection between the power inverter 2 and the commercial alternating-current supply system 3 is controlled.

The inverter circuit 20 is made inoperative during the time, such as the nighttime, when solar radiation is scanty or all gone and consequently the output voltage V1 of the solar battery 1 is lower than 170 V, which is a minimum requirement for power conversion. The relay 26 remains open in order to leave a fair margin for safety and avoid power loss.

Electric power necessary for actuating the control circuit for controlling the protective controller 32 and the inverter circuit 20 is supplied by the solar battery 1. As long as the protective controller 32 is in an actuated state, it monitors the output voltage V1 of the solar battery 1 by fetching the output from the isolation amplifier 36.

When the output voltage V1 of the solar battery 1 has reached 190 V, the protective controller 32 makes the drive circuit 40 ready for producing an output for activating the inverter circuit 20 and closes the relay 26. Now the two current supplies come to be in the concurrently operative state.

In this state, the inverter circuit 20 works so that the output produced thereby may have a frequency of 50 Hz and a power factor of 1. This means that only the effective power is supplied from the inverter circuit 20 to the load 4 and that all the reactive power needed by the load 4 is supplied by the commercial alternating-current supply system 3. The relay 26 opens and the inverter circuit 20 comes to be in an inactive state when the output voltage V1 of the solar battery 1 has come down to 170 V or less.

Reference will now be specifically made to how the protective controller 32 prevents the direct-current supply system from becoming an independent current supply.

Figure 4:
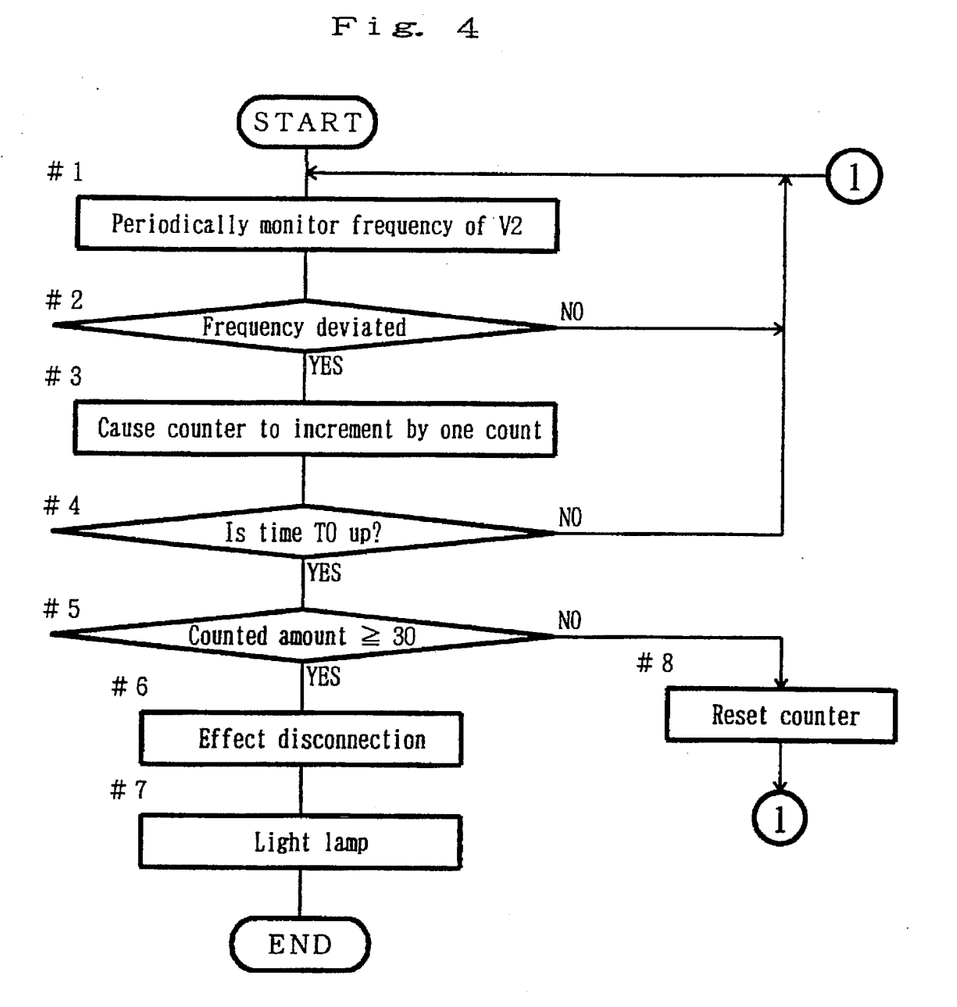
FIG. 4 is a flow chart illustrating an example of how a protective controller prevents the direct-current supply system from becoming an independent current supply.
Figure 5:
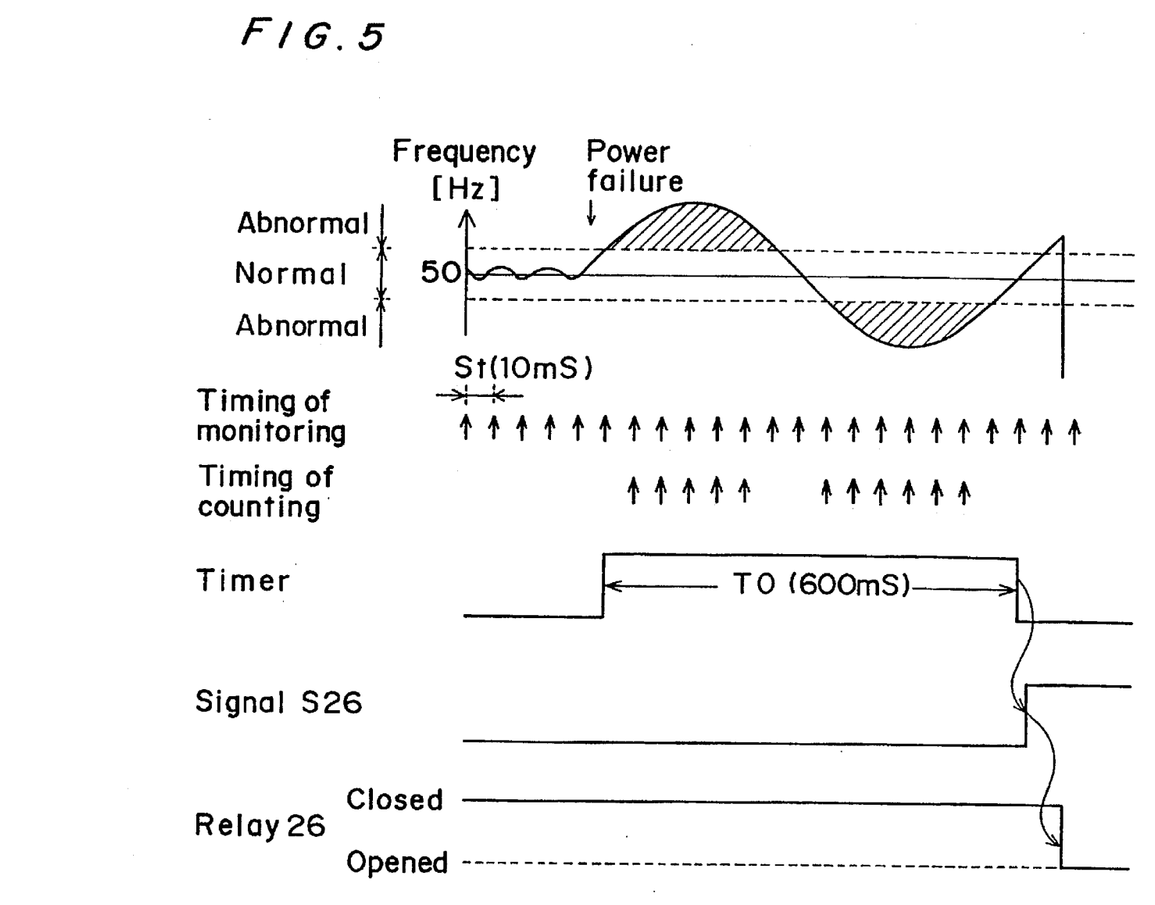
FIG. 5 is a timing chart illustrating how the direct-current supply system is prevented from becoming an independent current supply.

As shown in FIGS. 4 and 5, the protective controller 32 monitors the frequency of voltage V2 at the junction point P2 by fetching the output from the transformer 34 with a period St of 10 ms (step 1). The period St is timed by a software timer incorporated in the microprocessor.

When an accidental power failure happens or a scheduled power cut takes place in the commercial alternating-current supply system 3, the inverter circuit 20 comes to be in an independently active state and the filter circuit 46, on account of its phase response, comes to have a tendency of transition to a working condition where the gain of the filter circuit 46 assumes a maximum value, i.e. to a condition where the operating frequency of the filter circuit 46 changes to 48 Hz or 52 Hz. When the load 4 is of the kind provided with a power factor assuming a value other than 1, both the effective power and the reactive power are supplied from the inverter circuit 20 to the load 4. This causes a phase difference between the output current I of the inverter circuit 20 and voltage V2 at the junction point P2, and this phase difference in turn is another cause of a change in the working condition of the filter circuit 46. Since the operating frequency is capable of transition to either of the higher and lower sides of the commercial frequency, the operating frequency is bound to change irrespective as to whether the load 4 is inductive or capacitive. In other words, there is no dead band which comes into being when the operating frequency is capable of transition to only one side of the commercial frequency.

As the operating frequency of the filter circuit 46 changes, the frequency of the output current I of the inverter circuit 20 also changes. A change in the frequency of the output current I causes the frequency of voltage V2 at the junction point P2 to deviate from the commercial frequency. However, there are some cases where, according to the operating characteristics of the inverter circuit 20 and the control system, they have an effect of restoring the deviated frequency to the commercial frequency. In these cases, a change in the frequency of voltage V2 takes the form of a periodic change with the commercial frequency as a median.

At the moment when the protective controller 32 first detects a deviated frequency, time T0 (of which 600 ms are an example) is preset in a timer, and the number of times of detection begins to be counted. Until the preset time T0 is up, counting is continued in such a manner that, every time the deviated frequency is detected, a counter is caused to increment by one count (steps 2 to 4). The length of time T0 is selected in due consideration of the response time of components and so as to match the time period (e.g. 0.5 to 1 second) prescribed for the system interconnection involved.

When the preset time T0 expires, a cumulative value obtained from counting by the counter, i.e. the number of times of detection counted during the preset time T0, is compared with a predetermined criterion (which is supposed to be 30 in this case) (step 5).

When the cumulative value obtained from counting by the counter is greater than 30, the protective controller 32 judges the inverter circuit 20 to be in an independently active state and actuates the relay 26 so as to disconnect the inverter circuit 20 from the commercial alternating-current supply system 3. A lamp (not shown) is lighted to indicate the occurrence of a power failure or power cut in the commercial alternating-current supply system 3 (steps 6 and 7).

When the cumulative value obtained from counting by the counter is less than 30, this cumulative value is considered to indicate that the deviated frequency is only an instantaneous phenomenon or that the detection of abnormality is a false detection caused by noise. In this case, a power failure or power cut is not considered to have occurred in the commercial alternating-current supply system 2. The counter is reset so as to resume the monitoring of the frequency (step 8). As shown in FIG. 5, a first moment when an instruction for effecting the above-mentioned disconnection is given to the relay 26 is delayed by the time required for the above-described judgment to be passed after the lapse of time T0, and a second moment when the above-mentioned disconnection is actually effected is further delayed by the response time (about 10 ms) of the relay 26.

Thus the present invention provides a reliable means, free of malfunction which can be attributed to noise, for preventing the direct-current supply system from becoming an independent current supply even when a change in the frequency of voltage V2 at the junction point P2 takes the form of a periodic change so as to cause the deviated frequency to occur only intermittently, i.e., even when the number of times of such occurrence counted during the preset time T0 falls within a normal range. The means in accordance with the present invention permits distinction between the deviated frequency caused by a power failure or power cut in the commercial alternating-current supply system 3 and the deviated frequency which is attributed to other causes. The means in accordance with the present invention is in strict compliance with the limitation prescribed for the response time within which the above-mentioned disconnection is to be effected.

Reference will now be specifically made to another example of the method of detecting the state in which the direct-current supply system is an independent current supply.

Figure 6:
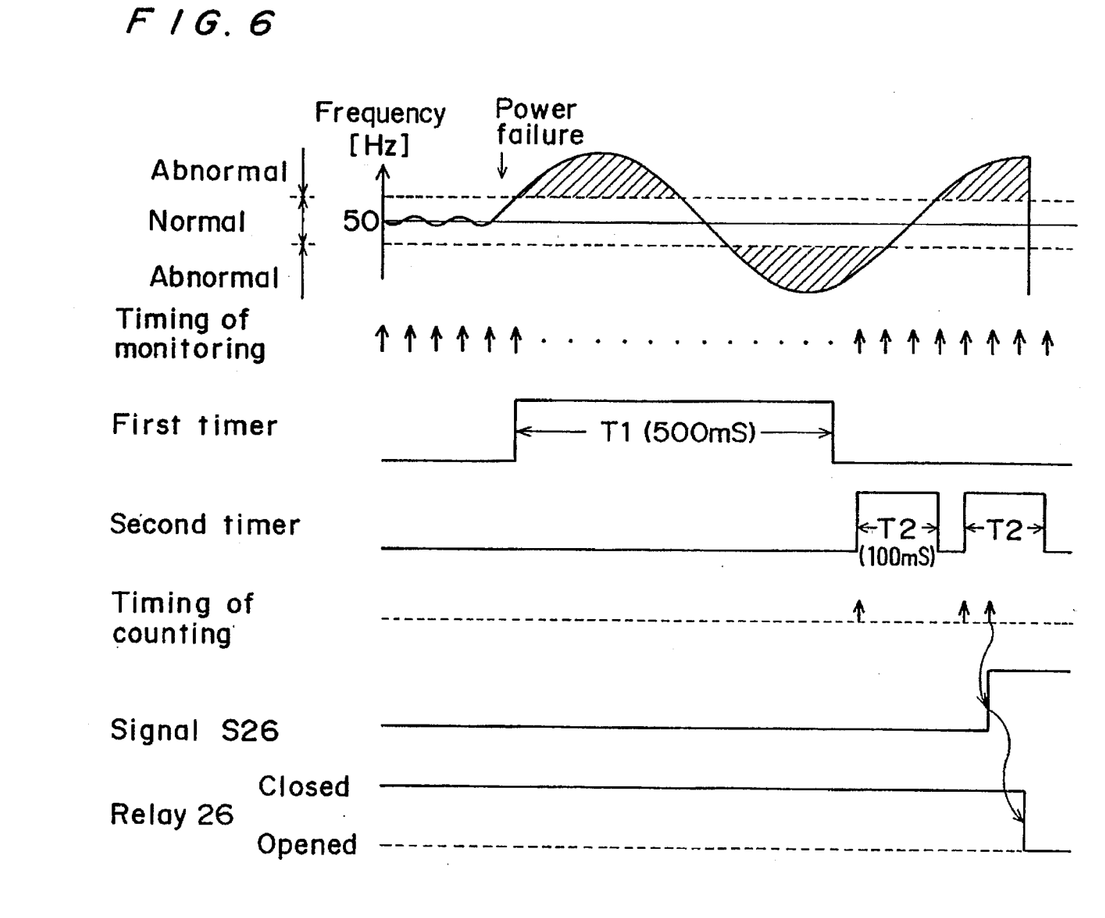
FIG. 6 is a timing chart illustrating another example of how the protective controller prevents the direct-current supply system from becoming an independent current supply.

As shown in FIG. 6, the protective controller 32 periodically fetches outputs produced by the transformer 34 and monitors the frequency of voltage V2 at the junction point P2. At the moment when the protective controller 32 first detects a deviated frequency, time T1 (of which 500 ms are an example) is preset in a first timer.

Time T2 (of which 100 ms are an example) is preset in a second timer when the protective controller 32 detects a deviated frequency during the prescribed time period (of which 500 ms are an example) after the lapse of time T1. The inverter circuit 20 is disconnected when the number of times of detection counted during the preset time T2 amounts to a plural number (e.g. two). If the deviated frequency is detected only once or never detected during the preset time T2, time is preset again in the second timer at the moment when the protective controller 32 detects a deviated frequency after the lapse of time T2, and the number of times of detection is counted. Thus, unless the number of times of detection counted during the preset time T2 amounts to a plural number, time is preset again and again in the second timer at the moment when the protective controller 32 detects a deviated frequency after the lapse of each time T2, and the number of times of detection is monitored. The total length of time during which the time T2 is preset again and again in the second timer corresponds to the time period (0.5 to 1 second) prescribed for the system interconnection involved.

During a period of 500 ms after the lapse of time T1 preset in the first timer, if the number of times of detection counted during the preset time T2 does not amount to a plural number, the protective controller 32 returns to the state in which it was initially found to be before it first detected a deviated frequency. Returning to the initial state, together with the resumption of the monitoring of the frequency, takes place after the lapse of the above-mentioned 500 ms.

Reference will now be specifically made to the results of an experiment made for the purpose of checking to see that the power inverter 2 properly works. A 3 KW pure resistance was used as a load 4, to which 3 kW effective power was supplied from the inverter circuit 20 so that no electrical energy might be supplied from the commercial alternating-current supply system 3 so as to effect a state of load equilibrium. The connection between the line 3a and the commercial alternating-current supply system 3 was cut so as to allow a simulated power failure to happen in the latter. Voltage V2 at the junction point P2 was detected. A checkup was made on whether or not the protective device 30 properly works.

As a result of the checkup, it was found that the frequency of voltage V2 at the junction point P2 changed from 50 Hz to 51 Hz or more within 0.5 second after the occurrence of the simulated power failure and that the relay 26 opened within 0.5 to 1 second after the occurrence thereof.

Another experiment was made with a varied selectivity Q of the BPF circuits 461 and 462 of the filter circuit 46. The result was that, under the condition of the selectivity Q set at 15 to 30, the relay 26 opened as soon and reliably as under the condition that the selectivity Q was set at 22.

In place of the drive circuit 40, a microcomputer may be allowed to fulfill the functions thereof. The drive circuit 40 and the protective controller 32 work as follows when the microcomputer is allowed to monitor the operating conditions of the direct-current supply system: Supervisory signals (representing the voltages V1, V2 and the current I) are fed to the drive circuit 40, which gives an instruction to the protective controller 32 so as to allow it to control the relay 26 and the breaker 28 according to the operating conditions of the direct-current supply system. On receipt of the instruction from the drive circuit 40, the protective controller 32 effects make-and-break control over the relay 26 and opens the breaker 28. At the time of activating the inverter circuit 20, the drive circuit 40 subjects it to slow starting-up so as to reduce noise and minimize an impulse current which may flow through circuit elements. By way of this slow starting-up, reference voltage Vref is approximated stepwise to the optimum operating voltage.

What is claimed is:

1. A power inverter for use in system interconnection, comprising:
   an inverter circuit changing an output power of a direct-current supply to alternating-current power to be delivered to a load connected to a commercial alternating-current supply system;
   means for separating a fundamental frequency component from voltage at a junction point between said inverter circuit and the commercial alternating-current supply system and for providing an output signal having the fundamental frequency, said means having frequency response characteristics such that a phase angle between the voltage and the output signal is reduced to 0° when the fundamental frequency component is at a first frequency which is equal to a commercial frequency, when the fundamental frequency component is at a second frequency which is higher than the commercial frequency, and when the fundamental frequency component is at a third frequency which is lower than the commercial frequency;
   a drive circuit capable of driving said inverter circuit into outputting a current in phase with the output signal taken from said means; and
   a protection device cutting a connection between said inverter circuit and the commercial alternating-current supply system when a frequency of the voltage at the junction point changes.

2. A power inverter as defined in claim 1, wherein said means comprises two band-pass filters connected in parallel with each other, one of said two band-pass filters having a center frequency lower than said commercial frequency, while the other of said two band-pass filters having a center frequency higher than said commercial frequency.

3. A power inverter as defined in claim 1, wherein said means comprises two band-pass filters connected in parallel with each other, one of said two band-pass filters having a center frequency lower by 2 Hz than said commercial frequency, while the other of said two band-pass filters having a center frequency higher by 2 Hz than said commercial frequency.

4. A power inverter as defined in claim 2 or 3, wherein each of said two band-pass filters has a selectivity falling within a range between 15 and 30.

5. A power inverter as defined in claim 1, wherein said means includes an output voltage limiting circuit.

6. A power inverter as defined in claim 1 or 5, wherein said protective device periodically monitors said frequency of said voltage at said junction point, that a prescribed time period begins to be measured at a moment when said protective device first detects a deviated frequency, and that, if a number of times of detection counted during said prescribed time period is larger than a predetermined number of times, said connection between said inverter circuit and said commercial alternating-current supply system is cut at a moment when said prescribed time period has elapsed.

7. A power inverter as defined in claim 1 or 5, wherein said protective device periodically monitors said frequency of said voltage at said junction point, that a prescribed time period begins to be measured at a moment when said protective device first detects a deviated frequency, and that, if a number of times of detection counted during said prescribed time period amounts to at least two, said connection between said inverter circuit and said commercial alternating-current supply system is cut at a moment when said prescribed time period has elapsed.

8. A power inverter as defined in claim 1, wherein said protective device includes means for detecting an actual output current of said inverter circuit and that, irrespective as to whether or not said frequency of said voltage at said junction point changes, said connection between said inverter circuit and said commercial alternating-current supply system is cut at a moment when an output produced by said inverter circuit has continued to be in a state of an overcurrent over a prescribed time period.

9. A power inverter as defined in claim 1, wherein said protective device comprises means for detecting an actual output current of said inverter circuit, a relay for completing or breaking a path of a current between said inverter circuit and said commercial alternating-current supply system, and a breaker for completing or breaking a path of a current between said relay and said commercial alternating-current supply system, that, when said frequency of said voltage at said junction point changes, said relay is actuated so as to cut said connection between said inverter circuit and said commercial alternating-current supply system, and that, irrespective as to whether or not said frequency of said voltage at said junction point changes, both of said relay and said breaker are actuated so as to cut said connection between said inverter circuit and said commercial alternating-current supply system at a moment when an output produced by said inverter circuit has continued to be in a state of an overcurrent over a prescribed time period.

10. A power inverter circuit for connection to a commercial alternating-current supply at a node and to a direct-current supply, the commercial alternating-current supply having a commercial signal frequency, said power inverter comprising:

an inverter circuit for receiving the direct-current supply and for supplying alternating-current power;

a detector circuit for detecting a first signal at the node and for producing an output signal having 0° phase angle relative to the first signal when the first signal is at a first frequency equal to the commercial signal frequency, when the first signal is at a second frequency higher than the commercial signal frequency, and when the first signal is at a third frequency lower than the commercial signal frequency; and a drive circuit for driving said inverter circuit on the basis of the output signal.

11. The power inverter defined in claim 10, wherein said detector circuit includes a plurality of band-pass filters each connected to the node and having respective center frequencies.

12. The power inverter defined in claim 11, wherein said detector circuit further includes an amplifier circuit for amplifying the first signal prior to being supplied to said plurality of band-pass filters.

13. The power inverter defined in claim 11, wherein a first one of said band-pass filters has a center frequency at the second frequency, and a second one of said band-pass filters has a center frequency at the third frequency.

14. The power inverter defined in claim 10, further comprising:

a protection device for monitoring a frequency of the first signal and for disconnecting said power inverter from the alternating-current supply when the monitored frequency of the first signal deviates from a desired range of frequencies.

15. The power inverter defined in claim 10, wherein said detector circuit includes an output signal limiter for limiting the voltage of the output signal to substantially the same voltage when the first signal is at the second frequency as when the first signal is at the third frequency.

16. A power inverter as defined in claim 1 or 10, wherein the phase angle is other than 0° between the first and second frequencies and between the first and third frequencies.

17. A power inverter as defined in claim 1, wherein said means has a gain greater at the second and third frequencies than at the first frequency.

18. A power inverter as defined in claim 10, wherein said detector circuit produces the output signal using a gain greater at the second and third frequencies than at the first frequency.

* * * * *